United States Patent [19]

Burton et al.

[11] Patent Number: 4,514,523

[45] Date of Patent: Apr. 30, 1985

[54] METHOD OF PRODUCING POLYESTER FOAMS USING BOROHYDRIDE DISPERSIONS

[75] Inventors: Thomas M. Burton; Helena Z. Kucharska, both of Sarnia, Canada

[73] Assignee: Fiberglas Canada Inc., Toronto, Canada

[21] Appl. No.: 607,046

[22] Filed: May 4, 1984

[30] Foreign Application Priority Data

Dec. 12, 1983 [CA] Canada .................................. 443119

[51] Int. Cl.$^3$ .............................................. C08J 9/06
[52] U.S. Cl. ...................................... 521/85; 521/138; 521/910
[58] Field of Search ........................ 521/85, 138, 910

[56] References Cited

U.S. PATENT DOCUMENTS

| | | | |
|---|---|---|---|
| 2,758,980 | 8/1956 | Talolay et al. | 521/85 |
| 2,909,493 | 10/1959 | Bush | 521/85 |
| 2,951,819 | 9/1960 | Wade | 521/85 |
| 3,167,520 | 1/1965 | Wade | 521/85 |
| 3,331,790 | 7/1967 | Scheurlen | 521/85 |
| 3,819,672 | 6/1974 | Joslyn | 521/138 |
| 3,823,098 | 7/1974 | Joslyn | 521/111 |
| 4,394,458 | 7/1982 | Wade | 521/85 |
| 4,397,948 | 8/1983 | Wade | 521/85 |
| 4,399,238 | 8/1983 | Wade | 521/85 |
| 4,431,752 | 2/1984 | Oswitch | 521/138 |

*Primary Examiner*—Morton Foelak
*Attorney, Agent, or Firm*—Sughrue, Mion, Zinn, Macpeak and Seas

[57] ABSTRACT

A method of making a foamed, polyester resin comprises mixing a liquid unsaturated polyester composition, with a liquid borohydride blowing agent which is a liquid borohydride complex, a borohydride complex in organic liquid medium or a borohydride salt dispersed in an organic liquid medium, which medium is at least substantially non-reactive with the borohydride salt. The resulting mixture is permitted to foam and gel under the initial influence of the blowing agent. In one embodiment the liquid unsaturated polyester includes a peroxide as a curing agent and an amine promoter is additionally admixed therewith. In this case a foamed, gelled and cured resin results. The borohydride complexes are usefully quaternary amine borohydrides.

20 Claims, No Drawings

METHOD OF PRODUCING POLYESTER FOAMS USING BOROHYDRIDE DISPERSIONS

BACKGROUND OF THE INVENTION (1) Field of the Invention

This invention relates to a method of making an expanded and crosslinked polyester resin composition, wherein a liquid unsaturated polyester composition catalyzed with a peroxide is mixed with a liquid borohydride blowing agent.

(2) Discussion of the Prior Art

The use of borohydrides, e.g. sodium borohydride ($NaBH_4$) as blowing or foaming agents for plastics material is known. Such borohydrides are extremely active reducing agents and, as such, one molecule of borohydride will produce four molecules of hydrogen on reaction with hydroxyl compounds.

$$NaBH_4 + 2H_2O \rightarrow NaBO_2 + 4H_2$$

It can be seen that the volume of gas produced is very high in proportion to the amount of borohydride. Thus borohydrides are desirable as foaming or blowing agents.

However, in the past, the use of borohydrides for this purpose has been subject to some disadvantages.

Incoporation of a foaming agent into a resin mix must be of even distribution throughout the mix to achieve even foaming of regular cell size over the whole of the foam. For this reason, foaming agents are often incorporated in liquid medium into resin mixes using conventional processing equipment in which prechosen proportions of liquids are mixed and dispensed from the equipment as a uniform mixture. It has, however, not been possible to use this technique with borohydrides partly because there are few liquids into which they can be incorporated as dispersions or solutions without reaction. Even where solutions are possible the borohydrides are not very soluble and large quantities of solution would necessarily be used to incorporate sufficient borohydride into the resin mix. The large quantities of solvent involved would be detrimental to foam production and stability. While the above problems are general, they are of especial importance in the case of polyester resins which contain groups reactive with the borohydride. Thus, while the use of borohydrides with other resins has sometimes been found practicable, with polyesters it has been found that the fast speed of the reaction causes great problems. The use of aqueous solutions of borohydrides has been proposed but the presence of water causes degradation of the resin. Thus, while it can be seen that the use of borohydrides as foaming agents is desirable, especially as it also acts as a free radical supplier thus acting also to initiate gelling, many polyester resins are currently foamed without their use.

Many references to methods of preparing foamed polyester resin compositions using chemical blowing agents are available. Those of interest are: U.S. Pat. No. 2,461,761, U.S. Pat. No. 3,479,303, U.S. Pat. No. 4,028,289, U.S. Pat. No. 4,119,583, U.S. Pat. No. 4,122,047, U.S. Pat. No. 4,347,331. These disclose use of carbonates or bicarbonates which produce carbon dioxide when contacted with acids, to act as the blowing agent for foaming of the unsaturated polyester resin compositions.

U.S. Pat. No. 4,216,294, U.S. Pat. No. 4,358,548 discloses the use of isocyanates in conjunction with hydroperoxides to produce carbon dioxide and free radicals for expansion and crosslinking of the polyester resin compositions.

U.S. Pat. No. 3,920,590, U.S. Pat. No. 4,322,502 disclose a process of simultaneous generation of nitrogen for foaming and free radicals for crosslinking of the unsaturated polyester resin compositions by using sulphonyl hydrazides, hydrazines or hydrazones.

U.S. Pat. Nos. 4,028,344, 4,029,615, 4,101,464 disclose the use of azo compounds which produce nitrogen and free radicals on contact with acidic substances to simultaneously foam and crosslink the polyester resin composition.

U.S. Pat. No. 3,823,098, Jap. Pat. No. 75.06665 disclose the use of sodium borohydride aqueous solutions activated by the promoted and catalyzed unsaturated polyester resin compositions to produce hydrogen and free radicals for simultaneous foaming and crosslinking of the polyester resin composition.

At present, none of the chemical foaming agents meet all of the necessary criteria of a good commercial product such as good shelf life, good pot life, lack of toxicity, compatibility with standard processing equipment and ability to produce uniform, crack-free, fast curing foams of a wide range of densities from a wide range of unsaturated polyester resin compositions. Thus, in systems requiring additions of water or acid, the additions are deleterious to the curing and the strength of the cured product; the isocyanates require low hydroxyl content resins, i.e. special polyester resins for stability (shelf and pot life) of the resin component; azo compounds were found too toxic and the hydrazides, hydrazines and hydrazones are found to be inefficient foamers, i.e. a full range of densities in the foamed product is difficult to achieve at a reasonable cost.

SUMMARY OF THE INVENTION

According to the invention there is provided a method of making a foamed, polyester resin which comprises mixing a liquid, unsaturated polyester compositions with a liquid borohydride foaming agent selected from a liquid borohydride complex, a borohydride complex dissolved in organic liquid medium and an inorganic borohydride salt dispersed in an organic liquid medium which medium is at least substantially non-reactive with the borohydride salt.

According to an aspect of the invention is provided a method of making a foamed and cured polyester resin comprising mixing a liquid, unsaturated polyester resin, which includes a peroxide as curing agent, with a liquid borohydride blowing agent selected from a liquid borohydride complex, a borohydride complex dissolved in an organic liquid medium, and an inorganic borohydride salt dispersed in an organic liquid medium, which medium is at least substantially non-reactive with the borohydride salt; and with an amine promotor, the resulting mixture being permitted to foam, gel and cure under the influence of the blowing agent, the peroxide and the promoter.

DETAILED DESCRIPTION OF THE INVENTION

Using the invention it may be possible to produce unsaturated polyester foams in a range of densities with fine, uniform cell structure. Useful promoters are tertiary amines.

In one embodiment the blowing agent comprises a finely divided borohydride salt dispersed in liquid rubber. Such a dispersion may be easily handled in conventional spray-mix apparatus.

Resins useful in the polyester resin composition of this invention are the thermosetting polyesterification or condensation products of polyhydric alcohols with polycarboxylic acids at least one of which is ethylenically unsaturated. In practice, these polyester resins are used in admixture with copolymerizable ethylenically unsaturated monomers. Preferred resins are of medium to high reactivity, i.e. those where molar ratio of ethylenically unsaturated polycarboxylic acid to other polycarboxylic acid is equal or greater than one.

The invention may comprise the use of a borohydride salt as a stable dispersion in a liquid polymer as a foaming agent. The choice of a carrier (liquid polymer) was arrived at after a long search as the borohydride reacts practically with every organic functional group with a few exceptions. Liquid polymers which are non-reactive towards the borohydride, such as polybutadienes or polyisobutylenes, can be used as carriers for the salt.

The borohydride salts may be any available salts e.g. potassium, lithium, aluminum, calcium and sodium. However, for commercial reasons, the sodium salt is most useful in practice.

The borohydride complexes used may usefully be quaternary ammonium borohydrides and in one embodiment when the borohydride is in its quaternary ammonium form, may have the formula

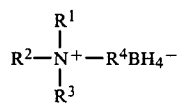

in which $R^1$, $R^2$ and $R^3$ may be the same or different and each is alkyl, alkenyl, cycloalkyl, aryl, alkaryl and aralkyl and $R^4$ is selected from alkyl and alkenyl groups having from 1 to 30 carbon atoms. Preferably $R^1$ and $R^2$ are methyl groups, $R^3$ is a benzyl group and $R^4$ has from 10 to 30 carbon atoms. These quaternary ammonium compounds which are liquid or easily liquifiable at ambient temperatures may be used in prechosen proportions with polyester compositions in conventional spray-mix apparatus. Without intending any undue limitation but, in guidance and explanation only, "liquid or easily liquifiable at ambient temperatures" includes those compounds which are liquid within the temperature range of 20°-25° C., those compounds which are liquid just outside that temperature range and those compounds which may be liquified in or around that temperature range by the addition of impurity.

In order to simultaneously foam and crosslink the polyester composition by the process of this invention, the polyester component is catalyzed with peroxide, hydroperoxide or perester. The catalysts useful in this invention are the peroxides which are used conventionally as curing agents for unsaturated polyester compositions. The particularly suitable ones are those which give acceptable pot life i.e. at least 8 hours when incorporated into the resin composition, i.e. benzoyl peroxide especially with admixture of cumyl hydroperoxide, tert. butyl hydroperoxide or tert. butyl perbenzoate.

The catalyzed resin compositions can also contain organic acids, hydroxyl bearing compounds such as alcohols, glycols and polyglycols or their mixtures to act as activators for promoting the decomposition of the borohydride. Also addition of suitable surfactant is helpful in establishing a fine, uniform cell structure. This can be of anionic, cationic, or nonionic nature. The preferred surfactant is of a silicone type. Fillers, additives such as fire retardants, dyes, thixotropic agents, waxes, etc. and reinforcement to modify properties and cost can also be incorporated into the resin composition. In order to promote a better cure of the foamed product obtained by the process of the invention, a promoter can be included in the system. Due to the chemistry of the unsaturated polyester resin and the foaming system, this has to be incorporated in the foaming component. The promoter may be a tertiary amine which is stable with the borohydride. Preferred amines are dimethyl aniline and diethyl aniline and their mixtures.

The unsaturated polyester resin composition, and the liquid foaming agent are eminently suitable for use with conventional spray up equipment (supplied by Venus, Binks, Glasscraft, etc.). The foaming, gelling and crosslinking proceed on emergence of the mix from the head of the spraying equipment. Application of heat is unnecessary, the crosslinking reaction is exothermic. Using spray up equipment, the two components can advantageously be mixed in the ratio of polyester resin to foaming agent of 100 to 0.5 to 100:12 by volume, preferably from 100 to 3 to 100 to 11, more preferably about 100 to 6.

In general, typical compositions of the two components fall within the following ranges by weight:

| Component A: | Unsaturated polyester resin | 100 parts |
|---|---|---|
| | Filler | 0–100 |
| | Surfactant | 0–5 |
| | Thixotropic Agent | 0–2 |
| | Organic Acid or Hydroxyl compound | 0–15 |
| | Peroxide - Hydroperoxide | 0.5–5 |
| Component B: | Borohydride (as 15% dispersion) | 0.5–15 |
| | Tertiary amine | 0–5 |

The foamed polyester products prepared according to the embodiments of this invention can be used to supply stiffness, strength, shrinkage control, etc. to sanitary ware, building panels, storage tanks, moulds, cast industrial parts, while contributing to weight saving, labor saving, high productivity and lower styrene emissions.

DESCRIPTION OF THE PREFERRED EMBODIMENTS

The following specific Examples are given for the purpose of illustrating the invention. In the Examples, the following materials were used:

Resin 1: Unsaturated polyester resin based on propylene glycol, isophthalic acid and maleic anhydride of 3:1 maleic:isophthalic molar ratio.

Resin 2: Unsaturated polyester resin based on propylene and diethylene glycols, isophthalic acid and maleic anhydride of 1:1 acid:anhydride ratio.

Resin 3: Unsaturated polyester resin based on propylene and diethylene glycol, adipic, phthalic and maleic anhydride of 3.3:1 acids to maleic anhydride molar ratio.

Resin 4: Unsaturated polyester resin based on propylene and diethylene glycols, phthalic and maleic anhydride of 2:1 phthalic to maleic anhydride ratio.

Resin 5: Unsaturated polyester resin based on dipropylene glycol and maleic anhydride.

Resin 6: Unsaturated polyester resin based on diethylene glycol, adipic, phthalic and maleic anhydride of 2:1 acids to maleic anhydride molar ratio.

Resin 7: Unsaturated polyester resin based on propylene glycol, phthalic and maleic anhydrides with 1:1 phthalic to maleic ratio.

Surfactant: (preferred) DC193, Dow Corning—a silicone glycol polymer.

Liquid Rubber: Ricon 131, Colorado Chemical Specialties—polybutadiene.

Thixotropic agent: Aerosil 200, Degussa—a fumed silicon dioxide.

Quaternary ammonium borohydrides were prepared from the following quaternary ammonium salts:

| | |
|---|---|
| MAQUAT MC 1412 | n-alkyl (50% $C_{14}$, 40% $C_{12}$, 10% $C_{16}$) dimethyl benzyl ammonium chloride |
| HYAMINE 3500 | |
| ALKAQUAT 451 | |
| MAQUAT MC 1416 | n-alkyl (60% $C_{14}$, 30% $C_{16}$, 5% $C_{12}$, 5% $C_{18}$) dimethyl benzyl ammonium chloride |
| ARQUAD 16-50 | trimethyl hexadecyl ammonium chloride | by the following methods:

(a) From aqueous solutions of the starting quaternary ammonium salt

Sodium borohydride (1.05 mole) as a 15% by weight solution in water at pH 12 was added to a solution of the quaternary ammonium chloride (1 mole) in water at pH 12. After agitation of two minutes, the mixture was extracted with methylene chloride, the organic layer separated and solvent removed (reduced pressure evaporation) to give the quaternary ammonium borohydride.

(b) From non-aqueous solutions of the starting quaternary ammonium salt

Powdered borohydride (1.1 mole) was added to a solution in isopropanol of the quaternary ammonium salt (1 mole) and aromatic amines (dimethyl aniline and diethyl aniline at 15% by weight in total) and the mixture stirred for 1 hour. After filtration to remove the precipitated sodium salt, a solution of the quaternary ammonium borohydride is obtained.

This solution may be used as foaming composition in the process of the present invention.

EXAMPLES 1-6

These examples illustrate use of borohydride salt dispersion in preparation of polyester foams.

Component A was prepared from 100 parts of unsaturated polyester resin or mixture of resins, benzoyl peroxide (55% paste), t-butyl perbenzoate, ethanol and surfactant as detailed in Table 1.

Component B was prepared from a 15% by weight dispersion of finely ground (colloid mill) sodium borohydride in Ricon 131 liquid rubber, dimethyl aniline, diethyl aniline and antimony oxide as detailed in Table 1. The two components were weighed into a 16 oz. cup and mixed mechanically for 15 seconds. Foaming and gelling occurred within 20 seconds and curing within 5 minutes. The densities and friability of cured foams are shown in Table 1.

TABLE 1

| Composition | Ex. 1 | Ex. 2 | Ex. 3 | Ex. 4 | Ex. 5 | Ex. 6 |
|---|---|---|---|---|---|---|
| Component A | | | | | | |
| Resin 1 | 60 | 60 | — | — | 60 | 80 |
| Resin 3 | 40 | — | 40 | 40 | — | 20 |
| Resin 5 | — | — | 60 | 60 | — | — |
| Resin 6 | — | 40 | — | — | 40 | — |
| Benzoyl Peroxide (55% paste) | 2.5 | 2.5 | 2.5 | 2.5 | 2.5 | 2.5 |
| t-butyl perbenzoate | — | 1.0 | 1.0 | — | 1.0 | 1.0 |
| Ethanol | 10 | 10 | 10 | 10 | 10 | 10 |
| Surfactant DC193 | 4 | 4 | 4 | 4 | 4 | 4 |
| Component B | | | | | | |
| 15% Borohydride in liquid rubber | 6 | 6 | 6 | 5.5 | 7.5 | 6 |
| Dimethyl aniline | 0.5 | 0.5 | 0.5 | 0.5 | 0.5 | 0.5 |
| Diethyl aniline | 0.2 | — | — | — | — | — |
| Antimony oxide | — | — | — | — | 5 | — |
| Density g/cm$^3$ | 0.17 | 0.24 | 0.35 | 0.37 | 0.17 | 0.16 |
| Friability % wt. loss | 7.2 | 6.7 | 1.7 | 1.9 | 7.6 | 12.7 |
| Compressive strength kPa at yield | | | | | | 1138 |
| % deformation at yield | | | | | | 8 |

EXAMPLE 7

Resin component A and blowing agent component B were prepared according to the formulation shown below. The two components were mixed and sprayed in 100:6 ratio by volume by using standard processing equipment, i.e. Venus H.I.S. System.

Fine celled, low density, 0.17 g/cm$^3$, crack free foam with compressive strength of 593 kPa at 3.5% deformation yield was obtained. The foam could be deposited in thickness varying from 0.5 cm to 2.5 cm.

| | | | |
|---|---|---|---|
| Component A | Resin 5 | 80 | pbw |
| | Resin 4 | 20 | " |
| | Benzoyl peroxide (55% paste) | 3 | " |
| | Cumyl hydroperoxide | 1 | " |
| | Surfactant DC193 | 4.0 | " |
| | Ethanol | 10 | " |
| | Aerosil 200 | 2.5 | " |
| | Alumina trihydrate | 50 | " |
| Component B | 15% Borohydride in Ricon 131 | 5 | " |
| | Dimethyl aniline | 0.5 | " |
| | Diethyl aniline | 0.2 | " |

EXAMPLES 8-18

These examples illustrate use of the quaternary ammonium borohydrides in preparation of low density foams with filled and unfilled resin formulations. The components A and B were prepared according to the formulations detailed in Table II. Mixing and spraying was carried out using standard processing equipment, i.e. Venus H.I.S. system.

The components were mixed in spray equipment in ratio of 100:3 to 100:11 by volume to give foams which gelled within 10-20 sec. and cured within 5 minutes. The densities obtained for individual foams are shown in Table II.

TABLE II

| Composition | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| Component A | | | | | | | | | | | |
| Resin 1 | 78.5 | 80 | 80 | 60 | 80 | 80 | — | — | — | — | — |
| Resin 2 | 21.5 | 20 | 20 | — | 20 | 20 | — | 100 | 100 | — | — |
| Resin 3 | — | — | — | 40 | — | — | — | — | — | — | — |
| Resin 4 | — | — | — | — | — | — | — | — | — | — | 100 |

TABLE II-continued

| Composition | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| Resin 7 | — | — | — | — | — | — | 100 | — | — | 100 | — |
| Aerosil 200 | 1.5 | 1.5 | 2 | 0.75 | 1 | 1 | 0.2 | 0.2 | 0.2 | 1.5 | 1.0 |
| Surfactant DC193 | 4 | 4 | 4 | 2 | 3 | 3 | 3 | 3 | 3 | 2 | 2 |
| Ethanol | 10 | 10 | 10 | 4 | 4 | 4 | 4 | 4 | 4 | — | — |
| Ethylene glycol | — | — | — | — | 4 | 4 | 4 | 4 | 4 | — | — |
| Alumina trihydrate | — | — | — | 66.7 | — | — | — | — | — | 100 | 100 |
| Chopped glass | — | — | — | — | — | 11 | — | — | — | — | — |
| Benzoyl peroxide (55% paste) | 3 | 4 | 4 | 4 | 1.5 | 1.5 | 3 | 2 | 2 | 4 | 4 |
| Cumyl hydroperoxide | — | — | 1 | 1 | 1 | 1 | 1 | 2 | 1 | — | — |
| t-butyl hydroperoxide | 1 | 1 | — | — | — | — | — | — | — | — | — |
| t-butyl perbenzoate | — | — | — | — | — | — | — | — | — | 2.5 | 2.0 |
| Styrene | — | — | — | 23 | — | — | — | — | — | 34 | 45 |
| Component B | | | | | | | | | | | |
| Quaternary ammonium borohydride | 9.9(1) | 6(2) | 3.5(3) | 5.5(3) | 5(3) | 5(3) | 3* | 3* | 3* | 3* | 3* |
| Dimethyl aniline | 0.6 | 0.5 | 0.5 | 0.5 | 0.5 | 0.5 | 0.3 | 0.3 | 0.3 | 0.4 | 0.4 |
| Diethyl aniline | 0.2 | 0.2 | 0.2 | 0.2 | 0.2 | 0.2 | 0.1 | 0.1 | 0.1 | 0.15 | 0.15 |
| Density g/cm$^3$ | 0.13 | 0.23 | 0.24 | 0.62 | 0.26 | 0.27 | 0.29 | 0.27 | 0.29 | 0.77 | 0.96 |
| Compressive strength at 10% kPa deformation | — | 1523 | — | 8991 | 2654 | 2268 | 1551 | — | — | — | — |
| Compressive strength kPa at yield | 751 | — | — | 9653 | — | — | 3992 | 3682 | 2448 | — | — |
| % deformation at yield | 4 | — | — | 20 | — | — | 26 | 6 | 6.5 | — | — |

Parts by weight (1) Quaternary ammonium borohydride based on Maquat 1412 and Hyamine 3500, (2) Quaternary ammonium borohydride based on Arquad and Maquat 1416 (3) Quaternary ammonium borohydride based on Alkaquat 451 all prepared by the aqueous method.
*prepared from Alkaquat 451 by the non-aqueous method.

What is claimed is:

1. A method of making a foamed polyester resin comprising mixing a thermosetting liquid, unsaturated polyester, which is a condensation product of a polyhydric alcohol and a polycarboxylic acid, at least one of which is ethylenically unsaturated, with a liquid borohydride foaming agent selected from a liquid borohydride complex, a borohydride complex dissolved in an organic liquid medium and an inorganic borohydride salt dispersed in an organic rubber liquid medium which medium is at least substantially non-reactive with the borohydride salt.

2. A method of making a foamed and cured polyester resin comprising mixing a liquid, unsaturated polyester resin, which includes a peroxide as curing agent, with a liquid borohydride blowing agent selected from a liquid borohydride complex, a borohydride complex dissolved in an organic liquid medium, and an inorganic borohydride salt dispersed in an organic liquid medium, which medium is at least substantially non-reactive with the borohydride salt; and with an amine promoter, the resulting mixture being permitted to foam, gel and cure under the influence of the blowing agent, the peroxide and the promotor.

3. A method as claimed in claim 2 in which the blowing agent comprises a finely divided inorganic borohydride salt dispersed in a liquid polymer.

4. A method as claimed in claim 2 in which the promoter comprises at least one tertiary amine.

5. A method as claimed in claim 3 in which the polyester composition includes a hydroxyl group containing activator for the borohydride salt.

6. A method as claimed in claim 5 in which the activator is selected from alcohols and glycols and organic acids.

7. A method as claimed in claim 3 in which the borohydride salt is sodium borohydride.

8. A method as claimed in claim 3 in which the liquid rubber is a polybutadiene.

9. A method as claimed in claim 3 in which the ratio in parts by volume of polyester composition to blowing agent ranges from 100:0.5 to 100:12.

10. A method as claimed in claim 9 in which the ratio in parts by volume of polyester composition to blowing agent is substantially 100:6.

11. A method as claimed in claim 3 or claim 9 in which mixing is carried out by means of mix-spraying apparatus.

12. A method as claimed in claim 1 in which the foaming agent is selected from a liquid quaternary ammonium borohydride and a quaternary ammonium borohydride in organic liquid medium.

13. A method as claimed in claim 12 in which the foaming agent comprises a quaternary ammonium borohydride of the formula:

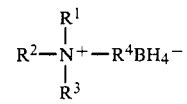

where $R^1$, $R^2$ and $R^3$ may be the same or different and each is selected from alkyl, alkenyl, cycloalkyl, aryl, alkaryl and aralkyl and $R^4$ is selected from alkyl and alkenyl groups having from 1 to 30 carbon atoms.

14. A method as claimed in claim 13 in which $R^1$ and $R^2$ are methyl groups, $R^3$ is a benzyl group and $R^4$ is an alkyl group having from 10 to 30 carbon atoms.

15. A method as claimed in claim 14 in which the polyester composition includes a hydroxyl group containing activator for the borohydride.

16. A method as claimed in claim 15 in which the activator is selected from alcohols and glycols and organic acids.

17. A method as claimed in claim 13 in which the promoter comprises at least one tertiary amine.

18. A method as claimed in claim 13 in which the ratio in parts by volume of polyester composition to foaming composition ranges from 100:0.5 to 100:12.

19. A method as claimed in claim 18 in which the ratio in parts by volume of polyester composition to foaming composition ranges from 100:3 to 100:11.

20. A method as claimed in claim 13 in which mixing is carried out by means of mix-spraying apparatus.

* * * * *